United States Patent
Fodor et al.

(10) Patent No.: US 12,219,495 B2
(45) Date of Patent: Feb. 4, 2025

(54) POWER CONTROL FOR BIDIRECTIONAL SIDELINK

(71) Applicant: Telefonaktiebolaget LM Ericsson (publ), Stockholm (SE)

(72) Inventors: Gabor Fodor, Hässelby (SE); Shehzad Ali Ashraf, Aachen (DE); Smriti Gopinath, Solna (SE); Jose Angel Leon Calvo, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 414 days.

(21) Appl. No.: 17/774,644

(22) PCT Filed: Nov. 9, 2020

(86) PCT No.: PCT/IB2020/060535
§ 371 (c)(1),
(2) Date: May 5, 2022

(87) PCT Pub. No.: WO2021/090295
PCT Pub. Date: May 14, 2021

(65) Prior Publication Data
US 2022/0377674 A1 Nov. 24, 2022

Related U.S. Application Data

(60) Provisional application No. 62/933,013, filed on Nov. 8, 2019.

(51) Int. Cl.
*H04W 52/14* (2009.01)
*H04W 52/24* (2009.01)
*H04W 92/18* (2009.01)

(52) U.S. Cl.
CPC ......... *H04W 52/14* (2013.01); *H04W 52/241* (2013.01); *H04W 52/242* (2013.01); *H04W 52/243* (2013.01); *H04W 92/18* (2013.01)

(58) Field of Classification Search
CPC . H04W 52/14; H04W 52/241; H04W 52/242; H04W 52/243
See application file for complete search history.

(56) References Cited

U.S. PATENT DOCUMENTS

| | | | |
|---|---|---|---|
| 2020/0228247 A1* | 7/2020 | Guo | H04L 1/0025 |
| 2021/0022091 A1* | 1/2021 | Li | H04W 52/242 |
| 2022/0210747 A1* | 6/2022 | Lee | H04W 92/18 |

OTHER PUBLICATIONS

Author Unknown, "Technical Specification Group Radio Access Network; NR; Multiplexing and channel coding (Release 15)," Technical Specification 38.212, Version 15.7.0, Sep. 2019, 3GPP Organizational Partners, 97 pages.

(Continued)

*Primary Examiner* — Erika A Washington
(74) *Attorney, Agent, or Firm* — Withrow & Terranova, PLLC

(57) ABSTRACT

Power control for a bidirectional Sidelink (SL) is provided. Solutions proposed herein limit the Physical SL Feedback Channel (PSFCH) transmit power level to that of the power level used for Physical SL Shared Channel (PSSCH) so as to prohibit too high transmit power for the PSFCH. In addition, if the difference between the PSSCH and PSFCH exceeds a preconfigured threshold (e.g., the PSFCH is too low), a Receiver (Rx) User Equipment (UE) can take preventive actions that ensure sufficient quality over the PSFCH. In further embodiments, both UEs continuously maintain the estimated SL Path Loss (PL) and transmit a single SL Channel State Information Reference Signal (SCSI-RS), and associated measurement reports rather than triggering new SCSI-RS transmissions and measurement reports for each PSSCH and associated PSFCH channel per SL (e.g., PC5) connection.

14 Claims, 8 Drawing Sheets

(56) References Cited

OTHER PUBLICATIONS

Author Unknown, "Technical Specification Group Radio Access Network; NR; Physical layer procedures for control (Release 15)," Technical Specification 38.213, Version 15.7.0, Sep. 2019, 3GPP Organizational Partners, 108 pages.

Author Unknown, "Technical Specification Group Radio Access Network; NR; Physical layer procedures for data (Release 15)," Technical Specification 38.214, Version 15.7.0, Sep. 2019, 3GPP Organizational Partners, 106 pages.

Intel Corporation, "R1-1707332: Sidelink UE-to NW Relaying for Wearable and IoT Use Cases," 3GPP TSG RAN WG1 Meeting #89, May 15-19, 2017, Hangzhou, China, 8 pages.

Intel Corporation, "R1-1910653: Sidelink physical layer procedures for NR V2X communication," 3GPP TSG RAN WG1 Meeting #98bis, Oct. 14-20, 2019, Chongqing, China, 20 pages.

LG Electronics, "R1-1910874: Feature lead summary for AI 7.2.4.5 Physical layer procedures for sidelink," 3GPP TSG RAN WG1 #98bis, Oct. 14-20, 2019, Chongqing, China, 38 pages.

MCC Support, "R1-190xxxx: Draft Report of 3GPP TSG RAN WG1 #98 v0.1.0 (Prague, Czech Rep, Aug. 26-30, 2019)," 3GPP TSG RAN WG1 Meeting #98bis, Oct. 14-18, 2019, Chongqing, China, 168 pages.

Invitation to Pay Additional Fees and Partial Search for International Patent Application No. PCT/IB2020/060535, mailed Feb. 12, 2021, 19 pages.

International Search Report and Written Opinion for International Patent Application No. PCT/IB2020/060535, mailed Apr. 6, 2021, 23 pages.

\* cited by examiner

POWER CONTROL FOR BIDIRECTIONAL SIDELINK

RELATED APPLICATIONS

This application is a 35 U.S.C. § 371 national phase filing of International Application No. PCT/IB2020/060535, filed Nov. 9, 2020, which claims the benefit of provisional patent application Ser. No. 62/933,013, filed Nov. 8, 2019, the disclosures of which are hereby incorporated herein by reference in their entireties.

TECHNICAL FIELD

The present disclosure relates generally to Device-to-Device (D2D) communication, and more particularly to Sidelink (SL) channels in telecommunications systems.

BACKGROUND

Vehicle-to-Anything (V2X) Communications and Device-to-Device (D2D) Communications Over the Sidelink (SL) in Third Generation Partnership Project (3GPP) New Radio (NR)

FIG. 1 is a schematic diagram of a communications environment illustrating V2X scenarios facilitated by cellular Uplink (UL), Downlink (DL), and SL. During Release 14 and Release 15, the 3GPP Long Term Evolution (LTE) standard has been extended with support of D2D communications (also referred to as SL or the "PC5 interface") targeting vehicular communications, collectively referred to as V2X communications. Besides Vehicle-to-Vehicle (V2V) communication, V2X includes Vehicle-to-Pedestrian or Pedestrian-to-Vehicle (collectively, V2P), Vehicle-to-Infrastructure (V2I), and Vehicle-to-Network (V2N).

The Fifth Generation (5G) V2X standardization in Release 16 aims to enhance the 3GPP NR system to meet stringent Quality of Service (QoS) requirements (e.g., in terms of latency and reliability) of advanced V2X services that are beyond the capabilities of the V2X safety services supported by LTE V2X Rel-14 and Rel-15. Therefore, the NR SL design includes new features, including physical layer unicast, power control, Hybrid Automatic Repeat Request (HARQ) and QoS management. A key technical feature of the NR SL for V2X is the capability to support physical-layer unicast and groupcast (also called as multicast) as compared with the broadcast-only LTE SL.

Modes of Operation of the NR SL

There are two operation modes for the NR SL:

Network-Based Mode 1: The network selects the resources and other transmit parameters assigned to SL User Equipments (UEs) by means of scheduling grants. In some cases, the network may control every single transmission parameter. In other cases, the network may select the resources used for transmission but may give the transmitter the freedom to select some of the transmission parameters, possibly with some restrictions.

Autonomous Mode 2: The UEs autonomously select the resources and other transmit parameters. In this mode, there may be no intervention by the network (e.g., out of coverage, unlicensed carriers without a network deployment) or very minimal intervention by the network (e.g., configuration of pools of resources, etc.). Mode 2 resource allocation is based on resource reservation and sensing of these reservations by UEs to predict future resource utilization.

Power Control in Cellular Networks and for D2D Communications

In cellular networks, including 3GPP NR networks, transmit power control is exercised for UL transmissions. The 3GPP specifications enable a UE to set the transmit power by taking into account the Path Loss (PL), number of scheduled resource blocks, targeted Signal-to-Noise Ratio (SNR) at the Base Station (BS) and some other parameters. Specifically, UL power control is set by the UE according to a set of equations that contains a number of parameters related to large scale fading (estimated PL), number of scheduled resource blocks, target SNR, and some other parameters. This rather general formula is often referred to as the Fractional PL (FRPL) compensation formula, which can be configured separately for the Physical UL Shared Channel (PUSCH) and Physical UL Control Channel (PUCCH).

For controlling the power in network-controlled D2D communications over the SL, a similar PL compensating formula can be used (see below), as it has been proposed and analyzed in some related works. When the FRPL-based power control is employed for SL transmissions, the power control scheme can optionally take into account the PL to the serving BS and the caused interference to the surrounding cellular network and nodes and UEs, in addition to the PL between the communication devices.

The FRPL equation is shown below:

$$P_{Tx} = P_0 - \alpha G + \Delta_{TF} + f(\Delta_{TPC}) + 10 \log M \qquad \text{Equation 1}$$

where $P_{Tx}$ is the UE transmit power, $P_0$ is a base power level used to control the SNR target, G is the estimated path gain between the UE and the BS, $\alpha$ is a parameter that controls the level of PL compensation, $\Delta_{TF} + f(\Delta_{TPC})$ is a dynamic offset depending on the Transport Format (TF, also referred to as the Modulation and Coding Scheme (MCS)) and Transmit Power Commands (TPCs) sent by the network, and M is the number of scheduled resource blocks. Specific applications to this formula can be used to achieve fixed power, fixed Signal-to-Interference-Plus-Noise Ratio (SINR) or SNR target, open loop with full or fractional path-loss compensation and closed loop power control schemes.

Power Control in NR UL and NR SL

Power Control for NR UL: As with LTE, in NR the transmit power in the UL (from the UE to the network) is often controlled by the NR BS (gNB) (see the FRPL equation above, in which parameters can be set and the TPC command can control the transmit power). This serves two main purposes:

To ensure that the received power (at the network) of the UL signal is at a satisfactory level to allow for successful decoding of the signal.
  At the same time, the transmit power should not be unnecessarily high as that would cause unnecessarily high interference to other UL signals at the gNB.

LTE and NR UL power control are based on a combination of:

Open-loop power control: the UE estimates the UL PL based on measuring signals in the DL and sets the transmit power accordingly.

Closed-loop power control: the network measures received UL powers based on measuring signals in the UL. Based on these past measurements the network controls the transmit power of the UE by sending TPCs to the UE.

In a simplified term, the baseline power control algorithm in the UL can be expressed as:

$$P=\min\{P_{cmax}, P'_{max}(PL_{uL}, P_0)\} \quad \text{Equation 2}$$

where the P denotes the transmit power, $P_{cmax}$ denotes the configured maximum UE transmit power per carrier/serving cell. $P'_{max}(PL_{UL}, P_0)$ is a collective term taking into account the impacts of UL PL $PL_{UL}$, the desired received power $P_0$ (configurable by the network), and several other factors such as the MCS and a power-control command in the case of closed-loop power control.

Power Control for NR SL: Transmit power control for SL serves the following purposes:

It helps to manage the UE power consumption, which may be important for certain UE types (e.g., a pedestrian UE). This aspect is crucial for resource constrained devices with limited battery power and less important for vehicle UEs.

It helps to adjust the transmission range to the intended receiver and ensure good reception at the receiver, at the same time limiting the interference caused towards non-intended receivers, including the gNB. It is especially important for D2D or SL operation in the licensed spectrum when SL and cellular resources overlap.

To achieve the above two goals and given what is done for the UL power control, it is natural to base the SL power control procedure on the PL estimated between the Transmitter (Tx) UE and gNB (if the Tx UE is in coverage) and also on the PL between the Tx UE and the Receiver (Rx) UE. Hence, the SL transmit power can be represented by the following generic formula:

$$P=\min\{P_{cmax}, P'_{max}(PL_{UL}), P_{req}(PL_{SL})\} \quad \text{Equation 3}$$

where $P_{cmax}$ is the maximum allowed transmit power configured by the UE for a carrier/serving cell. $P'_{max}(PL_{UL})$ is the maximum allowed transmit power when considering the interference to UL reception, where $PL_{UL}$ is the PL between the Tx UE and the gNB. This term is introduced to mitigate the interference to UL reception at the gNB. $P_{req}(PL_{SL})$ is the required transmit power calculated based on the SL PL $PL_{SL}$ between the Tx UE and the Rx UE in order to guarantee reliable reception(s).

The formula in Equation 3 reflects the current agreements in 3GPP RAN1 on open-loop transmit power control when both DL PL and SL PL are considered. RAN1 has also agreed not to support closed-loop power control in Rel-16 NR SL. Compared to the UL power control in Equation 2, the SL power control in Equation 3 decouples the required (or desired) transmit power from $P'_{max}$ because the desired receiver is another UE. Also note that in LTE SL, due to broadcast transmissions, only $P_{cmax}$ and $P'_{max}(PL_{UL})$ are considered since the set of target Rx UEs is too large for each individual SL $P_{req}$ to be relevant. However, for NR SL unicast and groupcast, different parameters can be used to determine $P_{req}$, enabling the Tx UE to adjust its transmit power accordingly.

The PL $PL_{SL}$ is determined by the Tx UE based on Reference Signal (RS) Received Power (RSRP) measurements (that is: the Rx UE measuring RSRP) that are reported back by the Rx UE to the Tx UE. Typically, larger distances between the Tx UE and the Rx UE means higher PL and hence increasing the transmit power to cover the distance. As can be noted in Equation 3, the SL transmit power $P_{req}$ is limited by the $P_{cmax}$ and $P'_{max}(PL_{UL})$ terms, which will be referred together as $P_{cmax}$ in the rest of the disclosure.

HARQ Feedback for NR SL and the Physical SL Feedback Channel (PSFCH): Reliable unicast and groupcast communication requires transmission of HARQ acknowledgement (Positive Acknowledgement (ACK) or Negative Acknowledgement (NACK), also called HARQ feedback) from the Rx UE(s) to the Tx UE to signal successful (or unsuccessful) decoding of a previous data transmission. In order to support reliable unicast and groupcast V2X communication in NR, 3GPP has agreed to support a new physical channel to carry the HARQ feedback in the SL. The new channel, called the PSFCH, is mapped to the last symbols available for SL in a slot as represented in FIG. 2.

FIG. 2 is a schematic diagram of the PSFCH, the Physical SL Shared Channel (PSSCH), and the Physical SL Control Channel (PSCCH) in the time-frequency domain. The PSFCH is in the form of a sequence (i.e., sequence-based PSFCH). Typically, the PSFCH sequence is a low Peak-to-Average Power (PAPR) sequence with good auto-correlation and cross-correlation properties. The ACK or NACK bits being sent are used to determine the corresponding PSFCH sequence. Also note that since PSFCH is a sequence, there is no RS (also known as pilot signal) embedded in the PSFCH, which is in contrast to other physical SL channels like the PSCCH (carrying control information) and the PSSCH (carrying data).

Problems with Existing Solutions

There currently exist certain challenge(s). The existing power control mechanisms for cellular UL and SL are designed to set the transmit power level at the Tx UE, including the transmit power level for the SL Physical Layer (PHY) channels PSSCH and PSCCH. However, these mechanisms are not directly applicable to determine the transmit power level for the SL PHY channel PSFCH transmitted by the Rx UE. Although this basic problem arises in both UE-UE unicast and multicast communications, the present disclosure focuses on unicast UE-UE communications.

Therefore, the existing power control solutions for PSSCH and PSCCH do not address the following problems:

FIG. 3 is a schematic diagram of SL communications between a Tx UE and an Rx UE using PSSCH for data transmission and PSFCH for HARQ feedback. A unidirectional case is illustrated, and in bidirectional cases both UEs act as both a Tx UE and an Rx UE. In either case, an RS is transmitted by the gNB to each UE. The Tx UE transmits a SL Channel State Information RS (SCSI-RS) to the Rx UE.

Problem 1: In the UE-UE communication scenario illustrated in FIG. 3, in which the UEs communicate over the SL (e.g., PC5 interface) and engage in bidirectional communications, there may be a large imbalance between the transmit power levels used for the PSSCH and PSFCH channels. This may result in large bit error rate and packet loss over the PSFCH (e.g., where the PSFCH power is too low) or high interference caused to the serving gNB (e.g., where the PSFCH power is too high). Note that the current 3GPP specifications do not support that the Rx UE sets the PSFCH transmit power level based on SL PL estimate.

FIG. 4 is a schematic diagram of SL communications between a Tx UE and an Rx UE with multiple parallel SL connections. A bidirectional case is illustrated, in which an RS is transmitted by the gNB to each UE (e.g., UE-A and UE-B) and each UE transmits a SCSI-RS to the other UE.

Problem 2: In the UE-UE communication scenario illustrated in FIG. 4, in which the UEs establish and maintain multiple parallel (e.g., unicast) connections, there is a large overhead in terms of SCSI-RS transmissions and measurement reports. In bidirectional SL scenarios, this large overhead is especially problematic, because it affects both UEs as both transmitters and receivers.

SUMMARY

Power control for a bidirectional Sidelink (SL) is provided. Solutions proposed herein limit the Physical SL Feedback Channel (PSFCH) transmit power level to that of the power level used for Physical SL Shared Channel (PSSCH) so as to prohibit too high transmit power for the PSFCH. In addition, if the difference between the PSSCH and PSFCH exceeds a preconfigured threshold (e.g., the PSFCH is too low), the Receiver (Rx) User Equipment (UE) can take preventive actions that ensure sufficient quality over the PSFCH. In further embodiments, both UEs continuously maintain the estimated SL Path Loss (PL) and transmit a single SL Channel State Information Reference Signal (SCSI-RS), and associated measurement reports rather than triggering new SCSI-RS transmissions and measurement reports for each PSSCH and associated PSFCH channel per SL (e.g., PC5) connection.

There are, proposed herein, various embodiments which address one or more of the issues disclosed herein. In some embodiments, a method is performed by a wireless device for controlling power in bidirectional SL communications, the method comprising: determining a PL-based transmit power for a PSFCH; and setting an initial PSFCH transmit power based on the PL-based transmit power for the PSFCH and limited by a PSSCH transmit power level.

In some embodiments, the method further comprises the step of receiving, from a Base Station (BS), a power threshold. In some embodiments, the PSSCH transmit power level is based on the power threshold. In some embodiments, the power threshold specifies a level of acceptable interference at the BS.

In some embodiments, the method further comprises performing a measurement on a Reference Signal (RS) transmitted by the BS; wherein the PL-based transmit power for the PSFCH is derived from the measurement on the RS such that interference at the BS remains under the power threshold.

In some embodiments, the wireless device is an Rx UE.

In some embodiments, the PL-based transmit power for the PSFCH is based on an estimated PL to the BS.

In some embodiments, the wireless device is a Transmitter (Tx) UE.

In some embodiments, the initial PSFCH transmit power is set to be a lesser of the PL-based transmit power for the PSFCH and the PSSCH transmit power level.

In some embodiments, the method further comprises calculating an absolute value of a difference between the PSSCH transmit power level and the initial PSFCH transmit power.

In some embodiments, the method further comprises, if the absolute value exceeds a preconfigured threshold, notifying at least one of a BS or another wireless device participating in the SL communications that the initial PSFCH transmit power is too low.

In some embodiments, the method further comprises, if the absolute value exceeds the preconfigured threshold, requesting one or more new configuration parameters from the BS such that the PSFCH transmit power can be increased.

In some embodiments, the method further comprises, if the absolute value exceeds the preconfigured threshold, switching to a cellular communication in place of the SL communications.

In some embodiments, a wireless device for controlling power in bidirectional SL communications is provided, the wireless device comprising: a communication interface; and processing circuitry configured to perform any of the steps of any of the previous embodiments.

In some embodiments, a method is performed by a wireless device for controlling power in bidirectional SL communications, the method comprising: storing configuration parameters which are used to configure one or more existing PC5 connections with another wireless device; and setting up a new PC5 connection by configuring transmit power setting parameters for the new PC5 connection based on the stored configuration parameters.

In some embodiments, the stored configuration parameters comprise a control parameter for a level of PL compensation $\alpha$ and a base power level $P_0$.

In some embodiments, the stored configuration parameters comprise a PSSCH transmit power level and a PSFCH transmit power level for the one or more existing PC5 connections.

In some embodiments, the method further comprises storing one or more Quality of Service (QoS) parameters associated with the one or more existing PC5 connections.

In some embodiments, the stored one or more QoS parameters comprise one or more of a packet loss rate, a maximum bit rate, a minimum bit rate, or a QoS Class Identifier (QCI).

In some embodiments, the method further comprises configuring the transmit power setting parameters equal to the stored configuration parameters of a select existing PC5 connection when the new PC5 connection has QoS parameters similar to those of any of the one or more existing PC5 connections.

In some embodiments, the method further comprises using a higher or lower transmit power setting than that used for a select existing PC5 connection when the new PC5 connection has QoS parameters that are different from any of the one or more existing PC5 connections.

In some embodiments, the transmit power setting comprises a PSSCH transmit power.

In some embodiments, a wireless device for controlling power in bidirectional SL communications is provided, the wireless device comprising: a communication interface; and processing circuitry configured to perform any of the steps of any of the previous embodiments.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
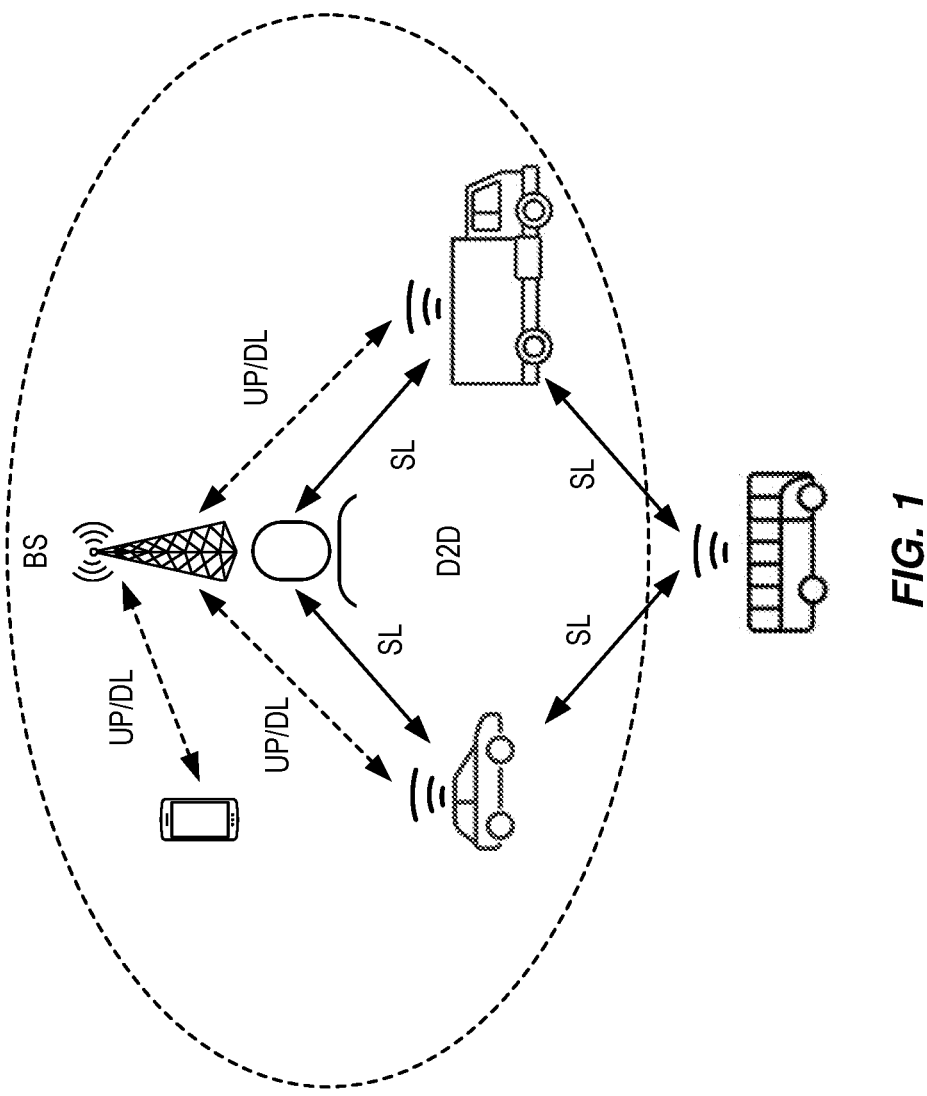
FIG. 1 is a schematic diagram of a communications environment illustrating Vehicle-to-Anything (V2X) scenarios facilitated by cellular Uplink (UL), Downlink (DL), and Sidelink (SL).
Figure 2:
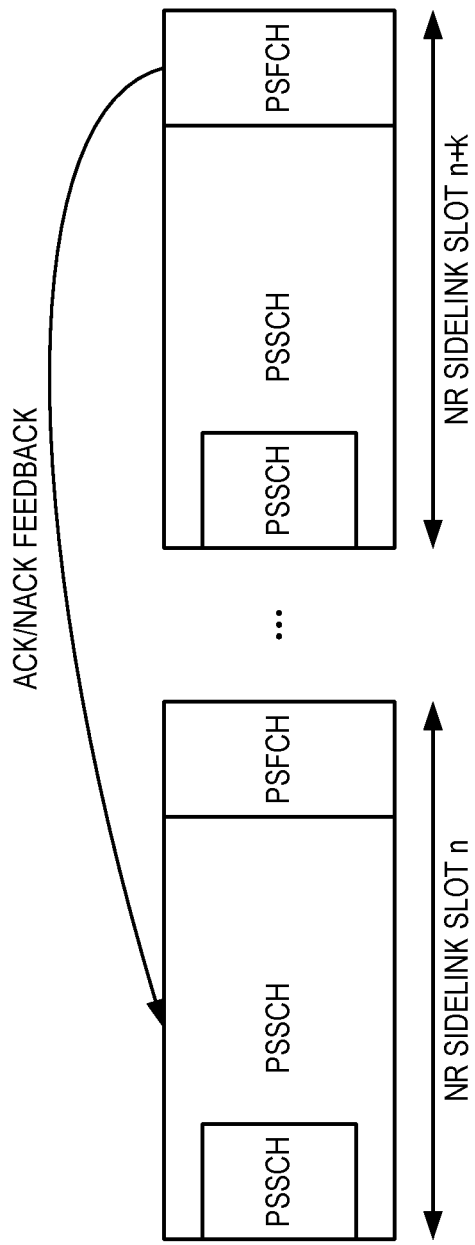
FIG. 2 is a schematic diagram of a Physical SL Feedback Channel (PSFCH), a Physical SL Shared Channel (PSSCH), and a Physical SL Control Channel (PSCCH) in the time-frequency domain.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a Base Station (BS) (e.g., a New Radio (NR) BS (gNB) in a Third Generation Partnership Project (3GPP) Fifth Generation (5G) NR network or an enhanced or evolved Node B (eNB) in a 3GPP Long Term Evolution (LTE) network), a high-power or macro BS, a low-power BS (e.g., a micro BS, a pico BS, a home eNB, or the like), a relay node, a network node that implements part of the functionality of a BS (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Transmitter (Tx) UE: As used herein, a UE that sends a data packet is referred to as the Tx UE.

Receiver (Rx) UE: As used herein, a UE that receives the data packet from the Tx UE is referred to as the Rx UE. There is a single Rx UE for a unicast transmission and there are multiple Rx UEs for a groupcast transmission. The Rx UE(s) send a Hybrid Automatic Repeat Request (HARQ) acknowledgment (Positive Acknowledgement (ACK) or Negative Acknowledgement (NACK), also known as HARQ feedback) to the Tx UE upon successful or unsuccessful decoding of the packet. The HARQ acknowledgment for Sidelink (SL) communications is sent in a Physical SL Feedback Channel (PSFCH).

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Power control for a bidirectional SL is provided. Certain aspects of the present disclosure and their embodiments may provide solutions to the aforementioned or other challenges.

Figure 3:
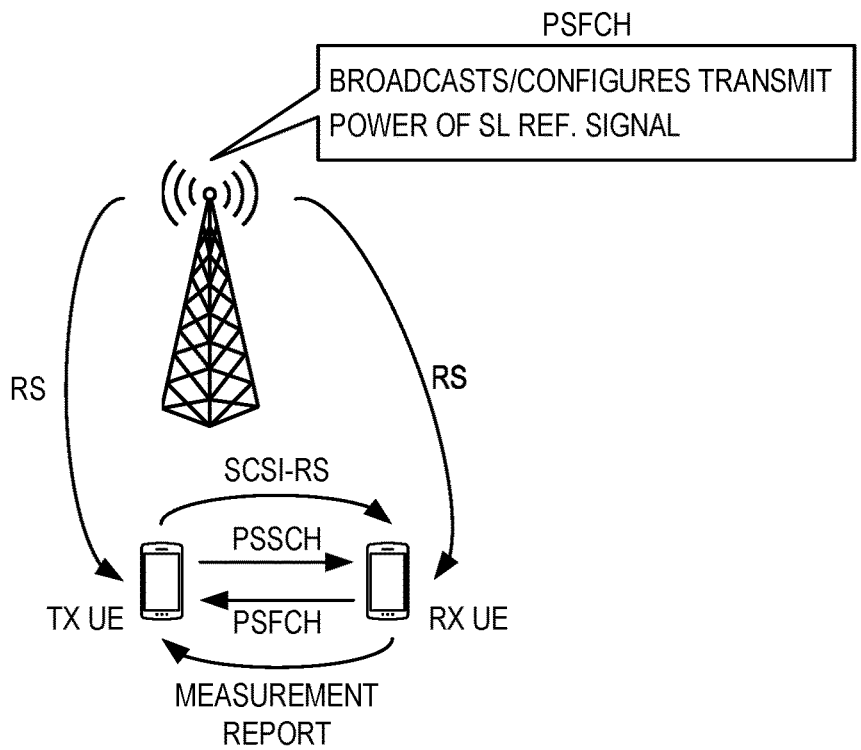
FIG. 3 is a schematic diagram of SL communications between a Transmitter (Tx) User Equipment (UE) and a Receiver (Rx) UE using PSSCH for data transmission and PSFCH for Hybrid Automated Repeat Request (HARQ) feedback.

The solution to Problem 1 described above builds on recognizing that the Rx UE illustrated in FIG. 3 under a traditional approach sets the PSFCH power without taking into account the Path Loss (PL) between the Rx UE and Tx UE. This is because under the traditional approach, the PSFCH power is determined based on the estimated PL between the Rx UE and the gNB. The proposed solution utilizes the fact that the SL communication is typically bidirectional between the UEs, and the Rx UE acts as a Tx UE in parallel with its Rx role. Based on this, the Rx UE limits the PSFCH transmit power level to that of the power level used for Physical SL Shared Channel (PSSCH) so as to prohibit too high transmit power for the PSFCH. In addition, if the difference between the PSSCH and PSFCH exceeds a preconfigured threshold (e.g., the PSFCH is too low), the Rx UE takes preventive actions that ensure sufficient quality over the PSFCH.

Figure 4:
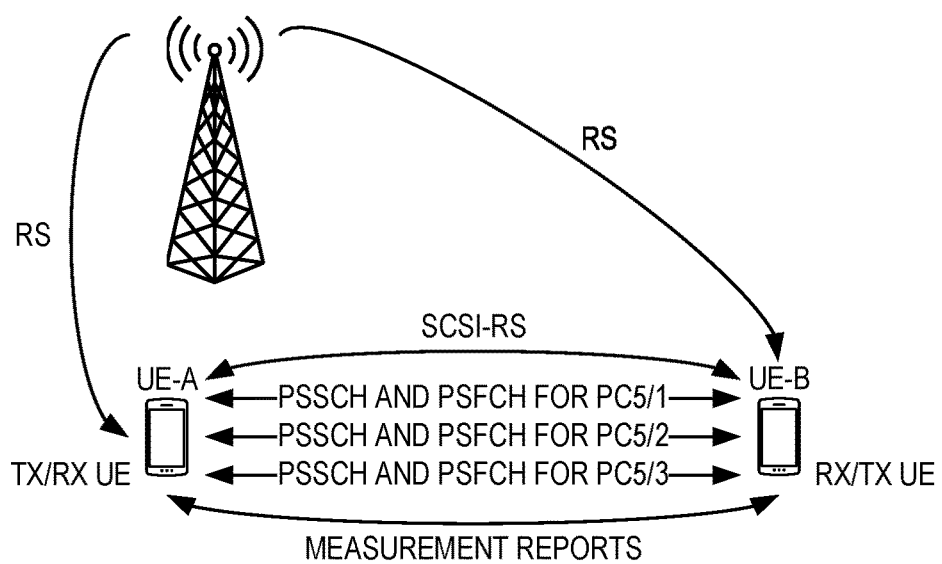
FIG. 4 is a schematic diagram of SL communications between a Tx UE and an Rx UE with multiple parallel SL connections.

The solution to Problem 2 described above builds on recognizing that a single SL Channel State Information Reference Signal (SCSI-RS) and associated measurements, measurement reports and PL estimation can be reused for the multiple PSSCH and PSFCH channels illustrated in FIG. 4. The solution elements developed for addressing Problem 1 are combined with both UEs continuously maintaining the estimated SL PL and transmitting a single SCSI-RS and associated measurement reports rather than triggering new SCSI-RS transmissions and measurement reports for each PSSCH and associated PSFCH channel per SL (e.g., PC5) connection.

Certain embodiments may provide one or more of the following technical advantage(s). An advantage of the solution to Problem 1 is that it ensures that the PSFCH does not cause high interference at the BS while setting a sufficiently high PSFCH transmit power for enabling the peer UE to decode the ACK/NACK signaling over the PSFCH with low bit error rate. Another advantage of the solution to Problem 2 is that it reduces the need for signaling exchange associated with SCSI-RS and measurement reporting over the SL.

Figure 5:
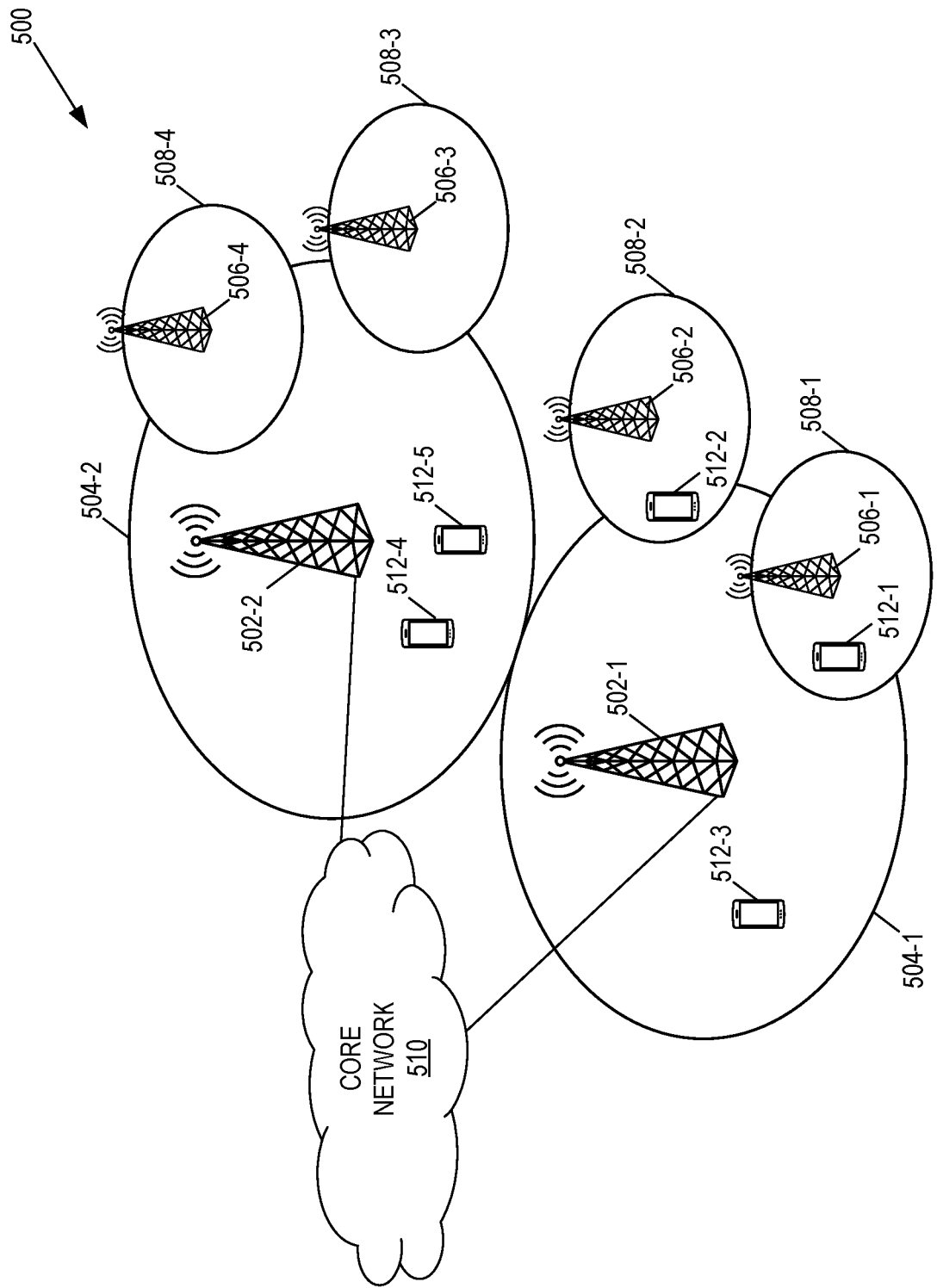
FIG. 5 illustrates one example of a cellular communications system in which embodiments of the present disclosure may be implemented.

In this regard, FIG. 5 illustrates one example of a cellular communications system 500 in which embodiments of the present disclosure may be implemented. In the embodiments described herein, the cellular communications system 500 is a 5G system (5GS) including a NR RAN or LTE RAN (i.e., Evolved Universal Terrestrial RAN (E-UTRAN)) or an Evolved Packet System (EPS) including a LTE RAN. In this example, the RAN includes BSs 502-1 and 502-2, which in LTE are referred to as eNBs (when connected to an Evolved Packet Core (EPC)) and in 5G NR are referred to as gNBs (e.g., LTE RAN nodes connected to 5G Core (5GC), which are referred to as gn-eNBs), controlling corresponding (macro) cells 504-1 and 504-2. The BSs 502-1 and 502-2 are generally referred to herein collectively as BSs 502 and individually as BS 502. Likewise, the (macro) cells 504-1 and 504-2 are generally referred to herein collectively as (macro) cells 504 and individually as (macro) cell 504. The RAN may also include a number of low power nodes 506-1 through 506-4 controlling corresponding small cells 508-1 through 508-4. The low power nodes 506-1 through 506-4 can be small BSs (such as pico or femto BSs) or Remote Radio Heads (RRHs), or the like. Notably, while not illustrated, one or more of the small cells 508-1 through 508-4 may alternatively be provided by the BSs 502. The low power nodes 506-1 through 506-4 are generally referred to herein collectively as low power nodes 506 and individually as low power node 506. Likewise, the small cells 508-1 through 508-4 are generally referred to herein collectively as small cells 508 and individually as small cell 508. The cellular communications system 500 also includes a core network 510, which in the 5GS is referred to as the 5GC. The BSs 502 (and optionally the low power nodes 506) are connected to the core network 510.

The BSs 502 and the low power nodes 506 provide service to wireless communication devices 512-1 through 512-5 in the corresponding cells 504 and 508. The wireless communication devices 512-1 through 512-5 are generally referred to herein collectively as wireless communication devices 512 and individually as wireless communication device 512. In the following description, the wireless communication devices 512 are oftentimes UEs, but the present disclosure is not limited thereto.

Figure 6:
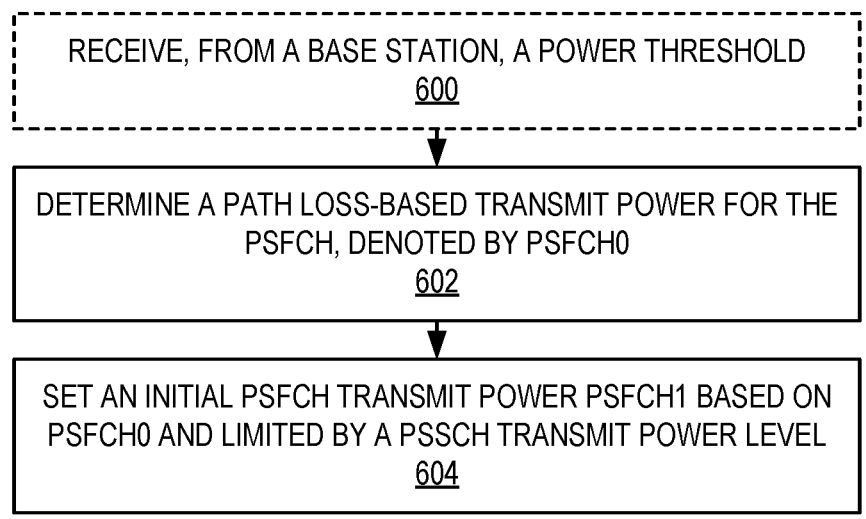
FIG. 6 is a flowchart illustrating a process for controlling power in bidirectional SL communications.

FIG. 6 is a flowchart illustrating a process for controlling power in bidirectional SL communications. The process can address Problem 1 described above. Accordingly, the process is described with reference to FIGS. 3 and 6. In this regard, the process includes one or more of the following steps:

The process may optionally begin at step 600, with receiving, from a BS, a power threshold. In some examples, the gNB sets up (e.g., defines or pre-defines) one or more power thresholds for an individual UE (e.g., each of the Tx UE and the Rx UE). Such thresholds specify what level of received interference power is acceptable for the gNB and the maximum difference between the PSSCH and PSFCH transmit power levels.

The process continues at step 602, with determining (e.g., by the Rx UE) a PL-based transmit power for the PSFCH, denoted by PSFCH0. The Rx UE can perform measurements on the Reference Signals (RSs) continuously transmitted by the BS (e.g., gNB) and estimate the PL to the serving BS. The Rx UE then derives the PL-based PSFCH transmit power PSFCH0 such that the caused interference at the BS remains under a predefined threshold (configured by the BS in Step 600):

$$PSFCH0-PL-\text{Margin} < \text{Predefined Interference Power at } BS \quad \text{Equation 4}$$

where Equation 4 constrains the PSFCH transmit power to a PSFCH0 value which satisfies the above equation (which may be expressed in decibel-milliwatts (dBm)).

The process continues at step 604, with setting (e.g., by the Rx UE) an initial PSFCH transmit power PSFCH1 based on PSFCH0 and limited by a PSSCH transmit power level. The current 3GPP Rel-16 specifications do not support SL PL-based power control for the PSFCH, therefore a solution that is applicable in NR Rel-16 networks must not use SL PL for PSFCH. According to exemplary embodiments herein, the Rx UE utilizes the fact that it also acts as a Tx UE and thus sets the PSSCH transmit power using existing schemes. Specifically, at step 604 an initial value for the PSFCH transmit power PSFCH1 is set as:

$$PSFCH1 = \text{MIN}(PSSCH \text{ power}, PSFCH0) \quad \text{Equation 5}$$

The initial PSFCH transmit power PSFCH1 is upper bounded by the PSSCH transmit power as well as by the PL-based PSFCH transmit power PSFCH0 and thereby it is not unnecessarily high and does not cause high interference at the BS. However, it may be too low with respect to the PSSCH transmit power and the SL distance over which the SL communications take place. Therefore, the Rx UE calculates the absolute value of a difference between the PSSCH transmit power and the initial PSFCH transmit power PSFCH1:

$$|PSSCH \text{ transmit power} - PSFCH1 \text{ transmit power}| \quad \text{Equation 6}$$

and continuously compares this value with a preconfigured threshold TH (from step 600).

If the above absolute value exceeds the preconfigured threshold TH, the Rx UE takes the following actions (in any combination):

Action 1: The Rx UE notifies the BS and/or the peer Tx UE of the PSFCH transmit power being too low. As a result of Action 1, the BS may reconfigure the Rx UE such that a higher transmit power than PSFCH1 is allowed. As an additional action, the BS may refrain from scheduling Uplink (UL) traffic on resource blocks over which the Rx UE transmits the PSFCH. As a further result of Action 1, the Tx UE, upon receiving the notification in Action 1 may reconfigure its operation of the HARQ procedure (state machine) such that it does not expect ACK/NACK signals over the PSFCH channel from the Rx UE.

Action 2: The Rx UE requests a different $\alpha$ and $P_0$ values from the serving BS. Higher $\alpha$ and higher $P_0$ value in the open loop PL compensation formula (Equation 1 above) leads to higher PSFCH power. As a result of Action 2, the BS may reconfigure the open loop power control parameters $\alpha$ and $P_0$ such that the resulting transmit power on the PSFCH becomes higher than with the original $\alpha$ and $P_0$ parameters.

Action 3: The Rx UE requests switching to cellular (e.g., Uu)-based communications. As a result of Action 3, the gNB can decide to terminate the SL communication session between the Tx UE and Rx UE. The gNB can change a communication mode between the Tx UE and Rx UE to cellular communications over the Uu cellular interface. This action (switching from SL or Device-to-Device (D2D) communications to cellular communications) in itself is referred to as mode selection.

Figure 7:
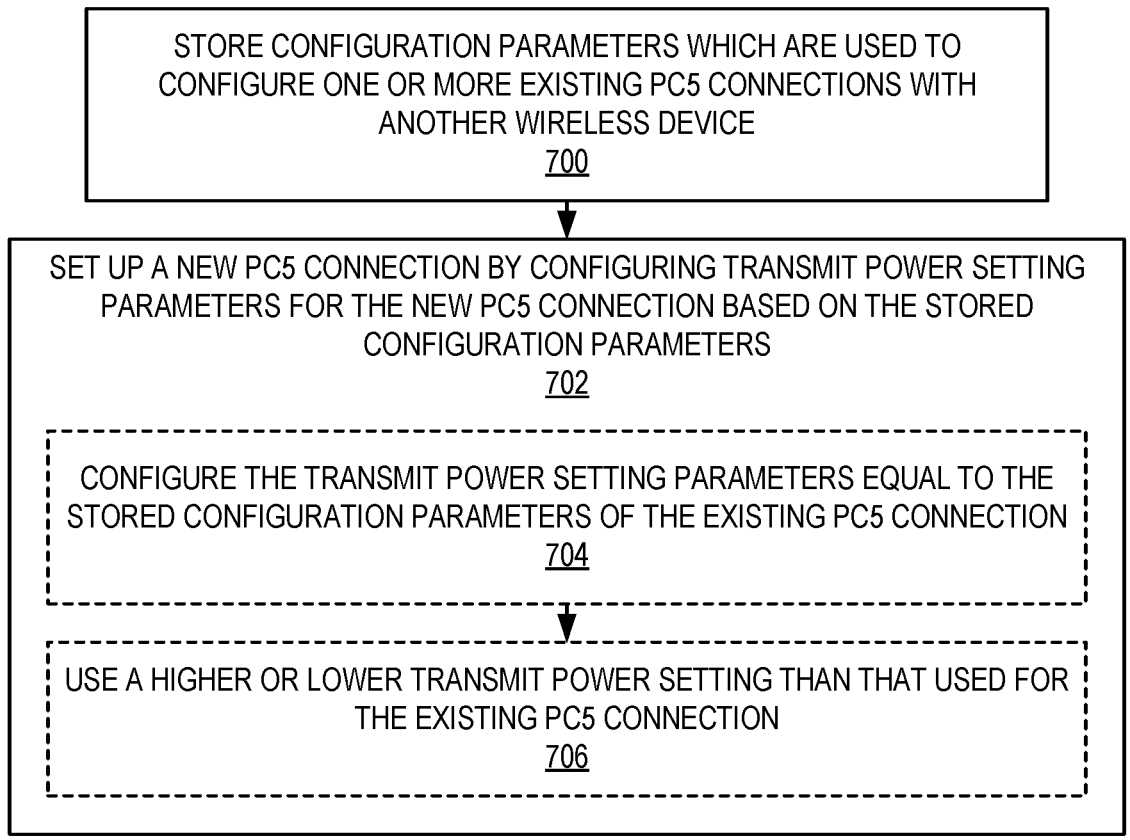
FIG. 7 is a flowchart illustrating another process for controlling power in bidirectional SL communications.

FIG. 7 is a flowchart illustrating another process for controlling power in bidirectional SL communications. The process can address Problem 2 described above. Accordingly, the process is described with reference to FIGS. 4 and 7. This process builds on the key observation that the PSFCH power control and associated parameter configuration can be reused across multiple PC5 connections. Thus, the steps of the process illustrated in FIG. 7 can be combined with one or more of the steps of the process illustrated in FIG. 6 in order to solve Problem 2.

The process begins at step 700, with a UE storing configuration parameters which are used to configure one or more existing PC5 connections (e.g., an SL) with another UE (e.g., wireless device). The UE can be a Tx UE configuring the PSSCH and/or an Rx UE configuring the PSFCH, and the stored configuration parameters can be $\alpha$ and $P_0$. In some examples, the UE can also store PSSCH and PSFCH transmit power levels for the existing PC5 connection. The UE can also store Quality of Service (QoS) parameters (e.g., packet loss rate, maximum bit rate, minimum bit rate, QoS Class Identifier (QCI)) associated with the PC5 connection.

The process continues at step 702, with the UE setting up a new PC5 connection by configuring transmit power setting parameters for the new PC5 connection based on the stored configuration parameters. Step 702 may optionally include sub-step 704, with the Rx UE configuring the transmit power setting parameters equal to the stored configuration parameters of the existing PC5 connection when setting up a new PC5 connection having QoS parameters similar to those of any of the one or more existing PC5 connections. Step 702 may optionally include sub-step 706, with the Tx UE using a higher or lower transmit power setting (e.g., PSSCH transmit power) than that used for the existing PC5 connection when setting up a new PC5 connection with QoS parameters that are different from any of the one or more existing PC5 connections.

Figure 8:
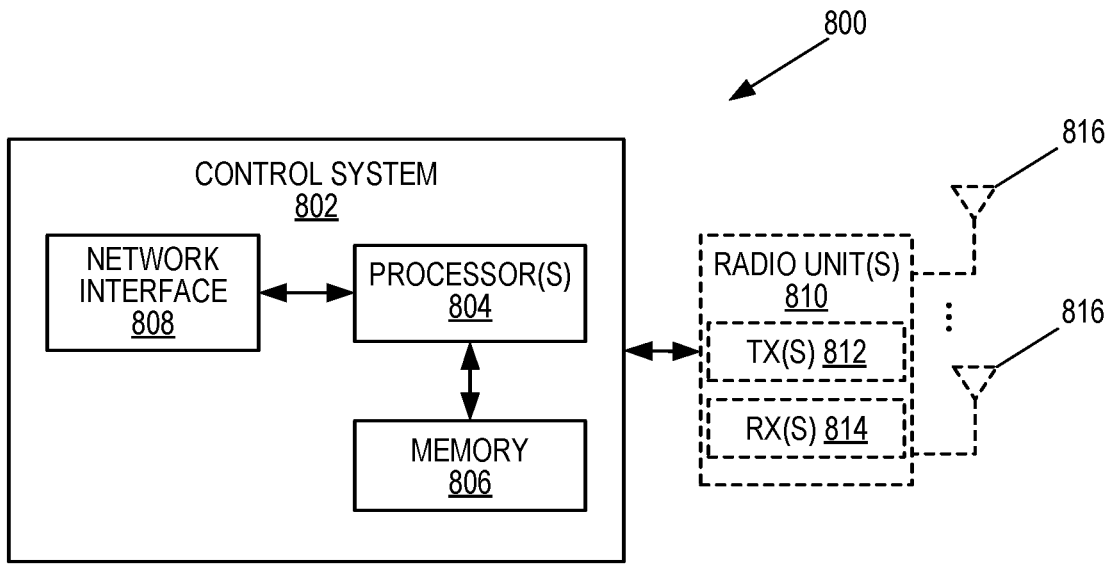
FIG. 8 is a schematic block diagram of a radio access node according to some embodiments of the present disclosure.

FIG. 8 is a schematic block diagram of a radio access node 800 according to some embodiments of the present disclosure. Optional features are represented by dashed boxes. The radio access node 800 may be, for example, a BS 502 or 506 or a network node that implements all or part of the functionality of the BS 502 or gNB described herein. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, the radio access node 800 may include one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). However, in some other embodiments, the radio unit(s) 810 and potentially the antenna(s) 816 are integrated together with the control system 802. The one or more processors 804 operate to provide one or more functions of a radio access node 800 as described herein. In some embodiments, the function(s) are implemented in software that is stored, e.g., in the memory 806 and executed by the one or more processors 804.

Figure 9:
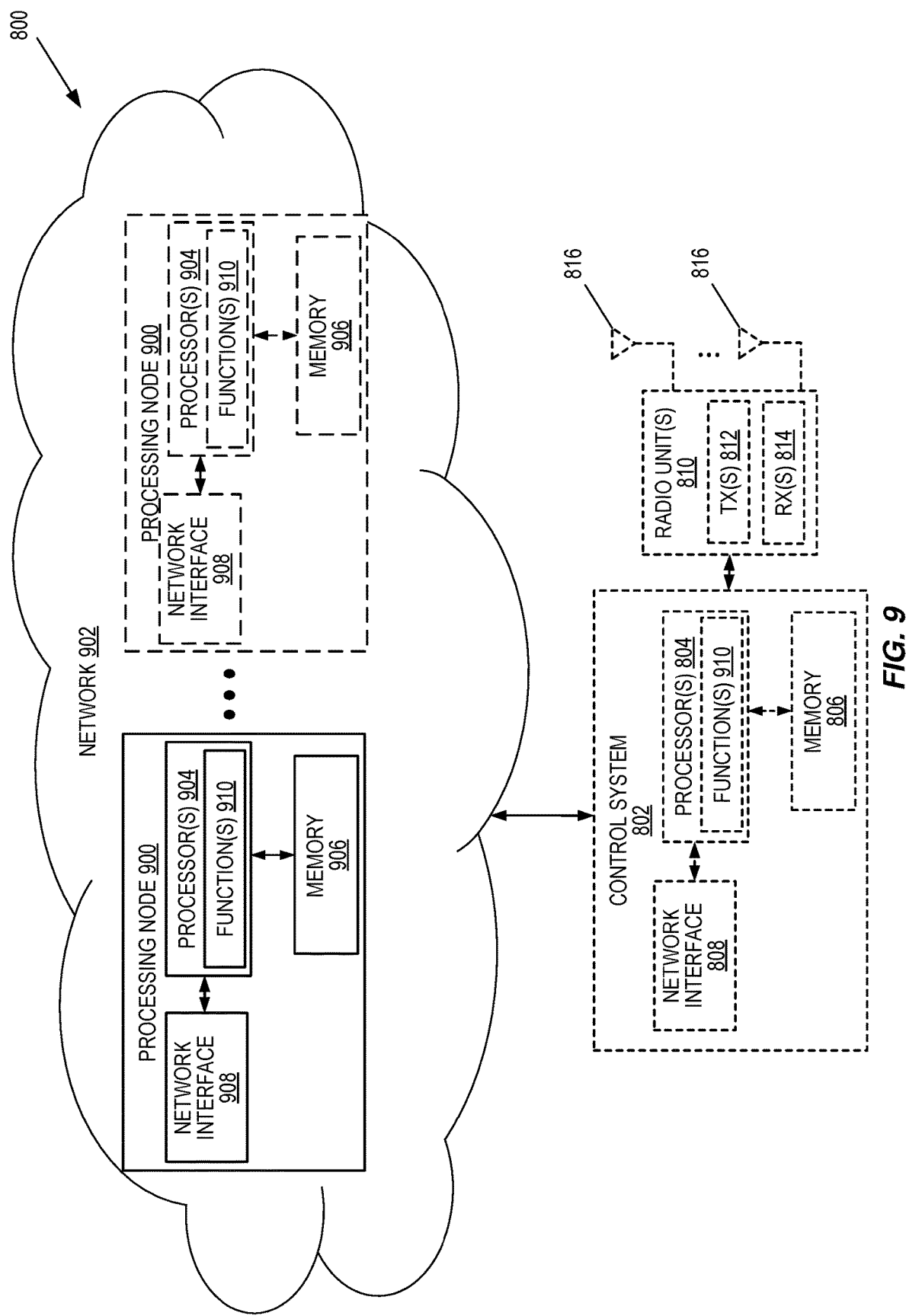
FIG. 9 is a schematic block diagram that illustrates a virtualized embodiment of the radio access node according to some embodiments of the present disclosure.

FIG. 9 is a schematic block diagram that illustrates a virtualized embodiment of the radio access node 800 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 may include the control system 802 and/or the one or more radio units 810, as described above. The control system 802 may be connected to the radio unit(s) 810 via, for example, an optical cable or the like. The radio access node 800 includes one or more processing nodes 900 coupled to or included as part of a network(s) 902. If present, the control system 802 or the radio unit(s) 810 are connected to the processing node(s) 900 via the network 902. Each processing node 900 includes one or more processors 904 (e.g., CPUs, ASICs, FPGAs, and/or the like), memory 906, and a network interface 908.

In this example, functions 910 of the radio access node 800 described herein are implemented at the one or more processing nodes 900 or distributed across the one or more processing nodes 900 and the control system 802 and/or the radio unit(s) 810 in any desired manner. In some particular embodiments, some or all of the functions 910 of the radio access node 800 described herein are implemented as virtual components executed by one or more virtual machines implemented in a virtual environment(s) hosted by the processing node(s) 900. As will be appreciated by one of ordinary skill in the art, additional signaling or communication between the processing node(s) 900 and the control system 802 is used in order to carry out at least some of the desired functions 910. Notably, in some embodiments, the control system 802 may not be included, in which case the radio unit(s) 810 communicate directly with the processing node(s) 900 via an appropriate network interface(s).

In some embodiments, a computer program including instructions which, when executed by at least one processor, causes the at least one processor to carry out the functionality of radio access node 800 or a node (e.g., a processing node 900) implementing one or more of the functions 910 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
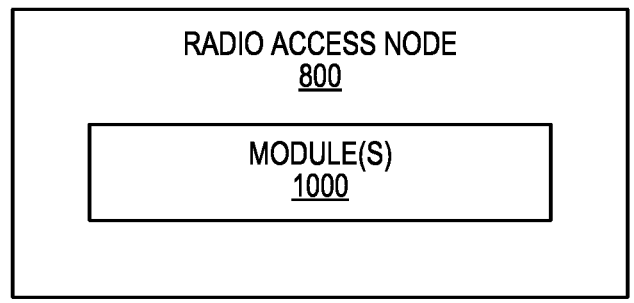
FIG. 10 is a schematic block diagram of the radio access node according to some other embodiments of the present disclosure.

FIG. 10 is a schematic block diagram of the radio access node 800 according to some other embodiments of the present disclosure. The radio access node 800 includes one or more modules 1000, each of which is implemented in software. The module(s) 1000 provide the functionality of the radio access node 800 described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
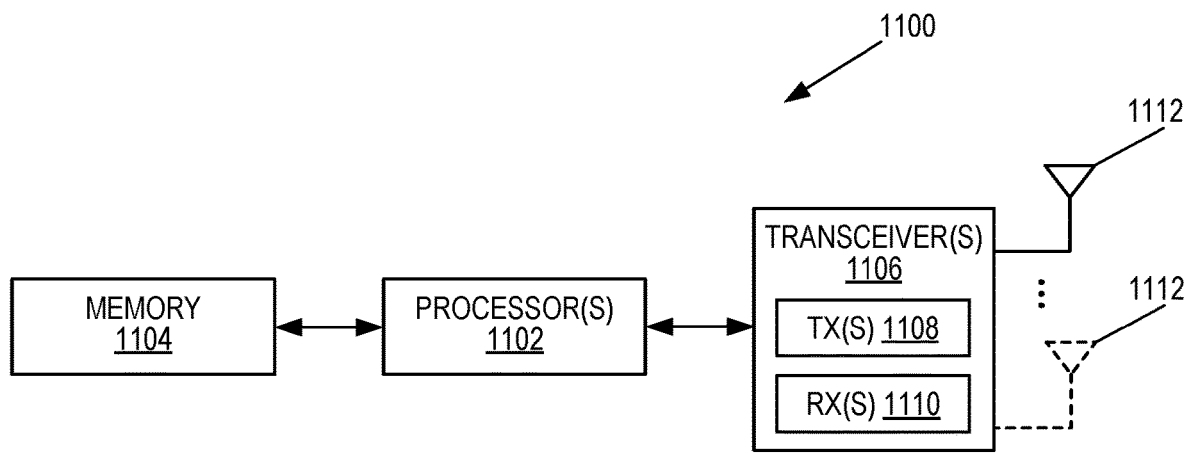
FIG. 11 is a schematic block diagram of a wireless communication device according to some embodiments of the present disclosure.

FIG. 11 is a schematic block diagram of a wireless communication device 1100 according to some embodiments of the present disclosure. As illustrated, the wireless communication device 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by one of ordinary skill in the art. The processors 1102 are also referred to herein as processing circuitry. The transceivers 1106 are also referred to herein as radio circuitry. In some embodiments, the functionality of the wireless communication device 1100 described above may be fully or partially implemented in software that is, e.g., stored in the memory 1104 and executed by the processor(s) 1102. Note that the wireless communication device 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the wireless communication device 1100 and/or allowing output of information from the wireless communication device 1100), a power supply (e.g., a battery and associated power circuitry), etc.

In some embodiments, a computer program including instructions which, when executed by at least one processor, causes the at least one processor to carry out the functionality of the wireless communication device 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
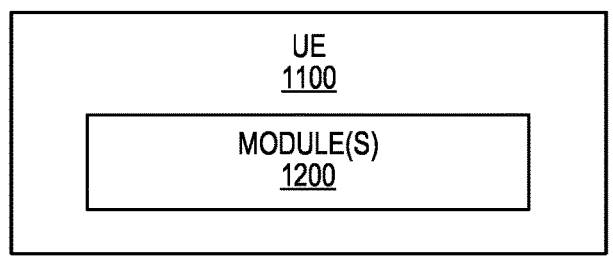
FIG. 12 is a schematic block diagram of the wireless communication device according to some other embodiments of the present disclosure.

FIG. 12 is a schematic block diagram of the wireless communication device 1100 according to some other embodiments of the present disclosure. The wireless communication device 1100 includes one or more modules 1200, each of which is implemented in software. The module(s) 1200 provide the functionality of the wireless communication device 1100 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

GROUP A EMBODIMENTS

Embodiment 1: A method performed by a wireless device for controlling power in bidirectional SL communications, the method comprising one or more of: determining a PL-based transmit power for a PSFCH; and setting an initial PSFCH transmit power based on the PL-based transmit power for the PSFCH and limited by a PSSCH transmit power level.

Embodiment 2: The method of embodiment 1 further comprising the step of receiving, from a BS, a power threshold.

Embodiment 3: The method of embodiment 2 wherein the PSSCH transmit power level is based on the power threshold.

Embodiment 4: The method of any of embodiments 2 to 3 wherein the power threshold specifies a level of acceptable interference at the BS.

Embodiment 5: The method of embodiment 4 further comprising performing a measurement on a RS transmitted by the BS; wherein the PL-based transmit power for the PSFCH is derived from the measurement on the RS such that interference at the BS remains under the power threshold.

Embodiment 6: The method of any of embodiments 1 to 5 wherein the wireless device is a Rx UE.

Embodiment 7: The method of any of embodiments 1 to 6 wherein the PL-based transmit power for the PSFCH is based on an estimated PL to a BS.

Embodiment 8: The method of any of embodiments 1 to 7 wherein the wireless device is a Tx UE.

Embodiment 9: The method of any of embodiments 1 to 8 wherein the initial PSFCH transmit power is set to be a lesser of the PL-based transmit power for the PSFCH and the PSSCH transmit power level.

Embodiment 10: The method of any of embodiments 1 to 9 further comprising the step of calculating an absolute value of a difference between the PSSCH transmit power level and the initial PSFCH transmit power.

Embodiment 11: The method of embodiment 10 further comprising, if the absolute value exceeds a preconfigured threshold, notifying at least one of a BS or another wireless device participating in the SL communications that the initial PSFCH transmit power is too low.

Embodiment 12: The method of any of embodiments 10 to 11 further comprising, if the absolute value exceeds a preconfigured threshold, requesting one or more new configuration parameters from a BS such that the PSFCH transmit power can be increased.

Embodiment 13: The method of any of embodiments 10 to 12 further comprising, if the absolute value exceeds a preconfigured threshold, switching to a cellular communication in place of the SL communications.

Embodiment 14: The method of any of the previous embodiments, further comprising: providing user data; and forwarding the user data to a host computer via transmission to a BS.

GROUP B EMBODIMENTS

Embodiment 15: A method performed by a wireless device for controlling power in bidirectional SL communications, the method comprising one or more of: storing configuration parameters which are used to configure one or more existing PC5 connections with another wireless device; and setting up a new PC5 connection by configuring transmit power setting parameters for the new PC5 connection based on the stored configuration parameters.

Embodiment 16: The method of embodiment 15, further comprising any of the steps of any of the Group A embodiments.

Embodiment 17: The method of any of embodiments 15 to 16 wherein the stored configuration parameters comprise a control parameter for a level of PL compensation a and a base power level $P_0$.

Embodiment 18: The method of any of embodiments 15 to 17 wherein the stored configuration parameters comprise a PSSCH transmit power level and a PSFCH transmit power level for the one or more existing PC5 connections.

Embodiment 19: The method of any of embodiments 15 to 18 further comprising the step of storing one or more QoS parameters associated with the one or more existing PC5 connections.

Embodiment 20: The method of embodiment 19 wherein the stored one or more QoS parameters comprise one or more of a packet loss rate, a maximum bit rate, a minimum bit rate, or a QCI.

Embodiment 21: The method of any of embodiments 15 to 20 wherein the wireless device is a Rx UE.

Embodiment 22: The method of embodiment 21 further comprising the step of configuring the transmit power setting parameters equal to the stored configuration parameters of a select existing PC5 connection when the new PC5 connection has QoS parameters similar to those of any of the one or more existing PC5 connections.

Embodiment 23: The method of any of embodiments 15 to 22 wherein the wireless device is a Tx UE.

Embodiment 24: The method of embodiment 23 further comprising the step of using a higher or lower transmit power setting than that used for a select existing PC5 connection when the new PC5 connection has QoS parameters that are different from any of the one or more existing PC5 connections.

Embodiment 25: The method of embodiment 24 wherein the transmit power setting comprises a PSSCH transmit power.

Embodiment 26: The method of any of the previous embodiments, further comprising: providing user data; and forwarding the user data to a host computer via transmission to a BS.

GROUP C EMBODIMENTS

Embodiment 27: A wireless device for controlling power in bidirectional SL communications, the wireless device comprising: processing circuitry configured to perform any of the steps of any of the Group A embodiments; and power supply circuitry configured to supply power to the wireless device.

Embodiment 28: A wireless device for controlling power in bidirectional SL communications, the wireless device comprising: processing circuitry configured to perform any of the steps of any of the Group B embodiments; and power supply circuitry configured to supply power to the wireless device.

Embodiment 29: A UE for controlling power in bidirectional SL communications, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 30: A UE for controlling power in bidirectional SL communications, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group B embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 31: The communication system of any of the previous 2 embodiments, further including the UE, wherein the UE is configured to communicate with a BS.

Embodiment 32: The communication system of any of the previous 3 embodiments, wherein: the processing circuitry of the host computer is configured to execute a host application, thereby providing user data; and the UE comprises processing circuitry configured to execute a client application associated with the host application.

Embodiment 33: A communication system including a host computer comprising: processing circuitry configured to provide user data; and a communication interface configured to forward the user data to a cellular network for transmission to a UE; wherein the UE comprises a radio interface and processing circuitry, the UE's components configured to perform any of the steps of any of the Group A embodiments.

Embodiment 34: A communication system including a host computer comprising: processing circuitry configured to provide user data; and a communication interface configured to forward the user data to a cellular network for transmission to a UE; wherein the UE comprises a radio interface and processing circuitry, the UE's components configured to perform any of the steps of any of the Group B embodiments.

Embodiment 35: The communication system of any of the previous 2 embodiments, wherein the cellular network further includes a BS configured to communicate with the UE.

Embodiment 36: The communication system of any of the previous 3 embodiments, wherein: the processing circuitry of the host computer is configured to execute a host application, thereby providing the user data; and the UE's processing circuitry is configured to execute a client application associated with the host application.

Embodiment 37: A method implemented in a communication system including a host computer, a BS, and a UE, the method comprising: at the host computer, providing user data; and at the host computer, initiating a transmission carrying the user data to the UE via a cellular network comprising the BS, wherein the UE performs any of the steps of any of the Group A embodiments.

Embodiment 38: A method implemented in a communication system including a host computer, a BS, and a UE, the method comprising: at the host computer, providing user data; and at the host computer, initiating a transmission carrying the user data to the UE via a cellular network comprising the BS, wherein the UE performs any of the steps of any of the Group B embodiments.

Embodiment 39: The method of any of the previous 2 embodiments, further comprising at the UE, receiving the user data from the BS.

Embodiment 40: A communication system including a host computer comprising: a communication interface configured to receive user data originating from a transmission from a UE to a BS; wherein the UE comprises a radio interface and processing circuitry, the UE's processing circuitry configured to perform any of the steps of any of the Group A embodiments.

Embodiment 41: A communication system including a host computer comprising: communication interface configured to receive user data originating from a transmission from a UE to a BS; wherein the UE comprises a radio interface and processing circuitry, the UE's processing circuitry configured to perform any of the steps of any of the Group B embodiments.

Embodiment 42: The communication system of any of the previous 2 embodiments, further including the UE.

Embodiment 43: The communication system of any of the previous 3 embodiments, further including the BS, wherein the BS comprises a radio interface configured to communicate with the UE and a communication interface configured to forward to the host computer the user data carried by a transmission from the UE to the BS.

Embodiment 44: The communication system of any of the previous 4 embodiments, wherein: processing circuitry of the host computer is configured to execute a host application; and the UE's processing circuitry is configured to execute a client application associated with the host application, thereby providing the user data.

Embodiment 45: The communication system of any of the previous 5 embodiments, wherein: processing circuitry of the host computer is configured to execute a host application, thereby providing request data; and the UE's processing circuitry is configured to execute a client application associated with the host application, thereby providing the user data in response to the request data.

Embodiment 46: A method implemented in a communication system including a host computer, a BS, and a UE, the method comprising: at the host computer, receiving user data transmitted to the BS from the UE, wherein the UE performs any of the steps of any of the Group A embodiments.

Embodiment 47: A method implemented in a communication system including a host computer, a BS, and a UE, the method comprising: at the host computer, receiving user data transmitted to the BS from the UE, wherein the UE performs any of the steps of any of the Group B embodiments.

Embodiment 48: The method of any of the previous 2 embodiments, further comprising, at the UE, providing the user data to the BS.

Embodiment 49: The method of any of the previous 3 embodiments, further comprising: at the UE, executing a client application, thereby providing the user data to be transmitted; and at the host computer, executing a host application associated with the client application.

Embodiment 50: The method of any of the previous 4 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 51: A method implemented in a communication system including a host computer, a BS, and a UE, the method comprising: at the host computer, receiving, from the BS, user data originating from a transmission which the BS has received from the UE, wherein the UE performs any of the steps of any of the Group A embodiments.

Embodiment 52: A method implemented in a communication system including a host computer, a BS, and a UE, the method comprising: at the host computer, receiving, from the BS, user data originating from a transmission which the BS has received from the UE, wherein the UE performs any of the steps of any of the Group B embodiments.

Embodiment 53: The method of any of the previous 2 embodiments, further comprising at the BS, receiving the user data from the UE.

Embodiment 54: The method of any of the previous 3 embodiments, further comprising at the BS, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
ACK Positive Acknowledgement
AMF Access and Mobility Function ASIC Application Specific Integrated Circuit
AUSF Authentication Server Function
BS Base Station
CPU Central Processing Unit
D2D Device-to-Device
DL Downlink
DSP Digital Signal Processor
eNB Enhanced or Evolved Node B
EPC Evolved Packet Core
EPS Evolved Packet System
E-UTRAN Evolved Universal Terrestrial Radio Access Network
FPGA Field Programmable Gate Array
FRPL Fractional Path Loss
gNB New Radio Base Station
gNB-CU New Radio Base Station Central Unit
gNB-DU New Radio Base Station Distributed Unit
HARQ Hybrid Automatic Repeat Request
HSS Home Subscriber Server
IoT Internet of Things
LTE Long Term Evolution
MCS Modulation and Coding Scheme
MME Mobility Management Entity
MTC Machine Type Communication
NACK Negative Acknowledgement
NEF Network Exposure Function
NF Network Function
NR New Radio
NRF Network Function Repository Function
NSSF Network Slice Selection Function
PAPR Peak-to-Average Power
PC Personal Computer
PCF Policy Control Function
P-GW Packet Data Network Gateway
PHY Physical Layer
PL Path Loss
PSCCH Physical Sidelink Control Channel
PSFCH Physical Sidelink Feedback Channel
PSSCH Physical Sidelink Shared Channel
PUCCH Physical Uplink Control Channel
PUSCH Physical Uplink Shared Channel
QCI Quality of Service Class Identifier
QoS Quality of Service
RAM Random Access Memory
RAN Radio Access Network
ROM Read Only Memory
RRH Remote Radio Head
RS Reference Signal
RSRP Reference Signal Received Power
Rx Receiver
SCEF Service Capability Exposure Function
SCSI-RS Sidelink Channel State Information Reference Signal
SINR Signal-to-Interference-Plus-Noise Ratio
SL Sidelink
SMF Session Management Function
SNR Signal-to-Noise Ratio
TF Transport Format
TPC Transmit Power Command
Tx Transmitter
UDM Unified Data Management
UE User Equipment
UL Uplink
UPF User Plane Function
V2I Vehicle-to-Infrastructure
V2N Vehicle-to-Network
V2P Vehicle-to-Pedestrian or Pedestrian-to-Vehicle
V2X Vehicle-to-Anything
V2V Vehicle-to-Vehicle Those skilled in the art will recognize improvements and modifications to the embodiments of the present disclosure. All such improvements and modifications are considered within the scope of the concepts disclosed herein.

The invention claimed is:

1. A method performed by a wireless device for controlling power in bidirectional Sidelink, SL, communications, the method comprising:
    determining a Path Loss, PL, based transmit power for a Physical SL Feedback Channel, PSFCH; and
    setting an initial PSFCH transmit power based on the PL-based transmit power for the PSFCH and limited by a Physical SL Shared Channel, PSSCH, transmit power level.

2. The method of claim 1 further comprising receiving, from a Base Station, BS, a power threshold.

3. The method of claim 2 wherein the PSSCH transmit power level is based on the power threshold.

4. The method of claim 2 wherein the power threshold specifies a level of acceptable interference at the BS.

5. The method of claim 4 further comprising performing a measurement on a Reference Signal, RS, transmitted by the BS;
    wherein the PL-based transmit power for the PSFCH is derived from the measurement on the RS such that interference at the BS remains under the power threshold.

6. The method of claim 1 wherein the wireless device is a Receiver, Rx, User Equipment, UE.

7. The method of claim 1 wherein the PL-based transmit power for the PSFCH is based on an estimated PL to a Base Station, BS.

8. The method of claim 1 wherein the wireless device is a Transmitter, Tx, User Equipment, UE.

9. The method of claim 1 wherein the initial PSFCH transmit power is set to be a lesser of the PL-based transmit power for the PSFCH and the PSSCH transmit power level.

10. The method of claim 1 further comprising calculating an absolute value of a difference between the PSSCH transmit power level and the initial PSFCH transmit power.

11. The method of claim 10 further comprising, if the absolute value exceeds a preconfigured threshold, notifying at least one of a Base Station, BS, or another wireless device participating in the SL communications that the initial PSFCH transmit power is too low.

12. The method of claim 10 further comprising, if the absolute value exceeds a preconfigured threshold, requesting one or more new configuration parameters from a Base Station, BS, such that the PSFCH transmit power can be increased.

13. The method of claim 10 further comprising, if the absolute value exceeds a preconfigured threshold, switching to a cellular communication in place of the SL communications.

14. A wireless device for controlling power in bidirectional Sidelink, SL, communications, the wireless device comprising:
    a communication interface; and
    processing circuitry configured to:
        determine a Path Loss, PL, based transmit power for a Physical SL Feedback Channel, PSFCH; and set an initial PSFCH transmit power based on the PL-based transmit power for the PSFCH and limited by a Physical SL Shared Channel, PSSCH, transmit power level.

* * * * *